Aug. 30, 1932.     J. HARTNESS     1,874,517
SCREW THREAD GAUGING
Filed Aug. 23, 1928     3 Sheets-Sheet 1
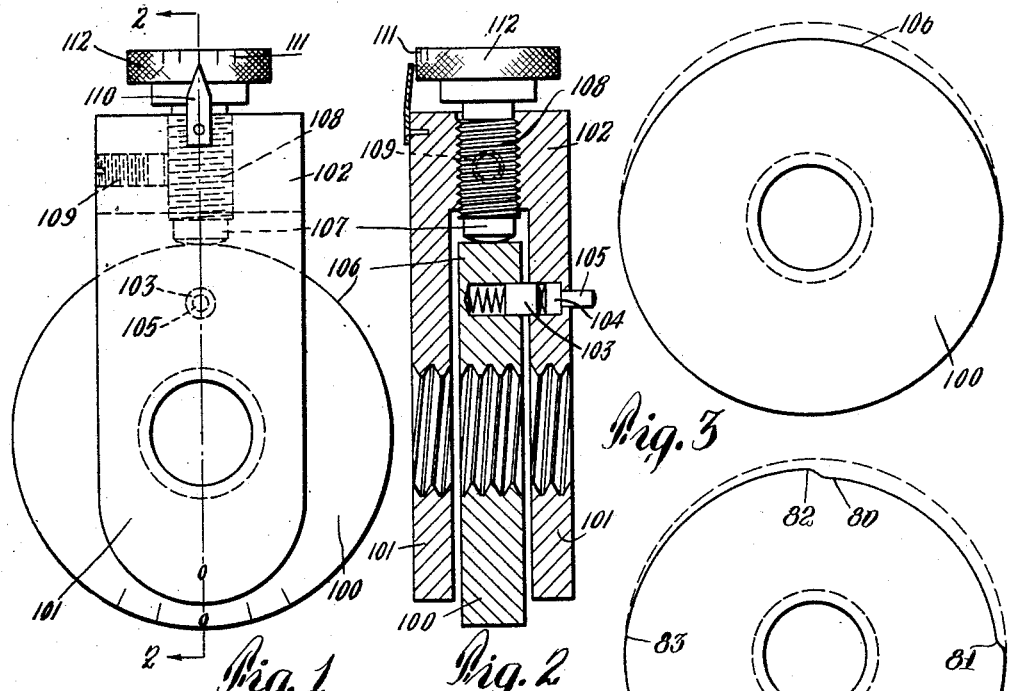
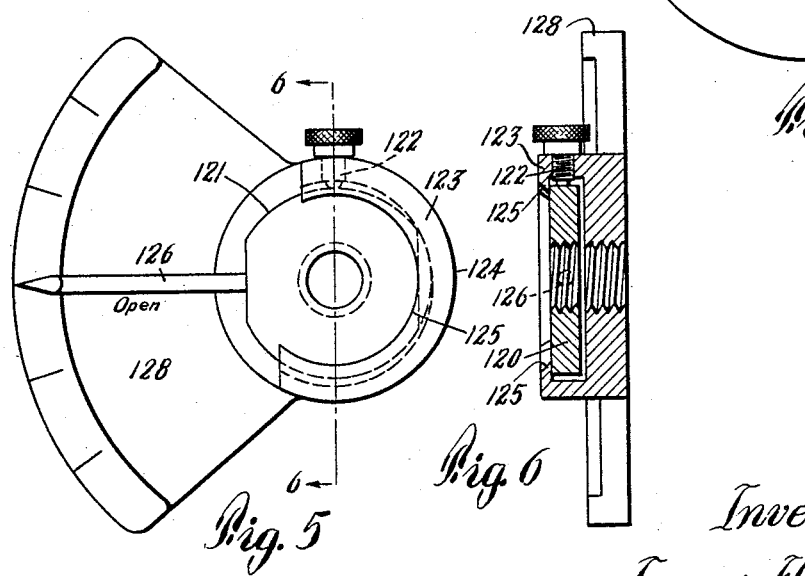
Inventor:
James Hartness.

Aug. 30, 1932. J. HARTNESS 1,874,517
SCREW THREAD GAUGING
Filed Aug. 23, 1928 3 Sheets-Sheet 2

Inventor:
James Hartness.
by Wright Brown Quinby & May
Att'ys.

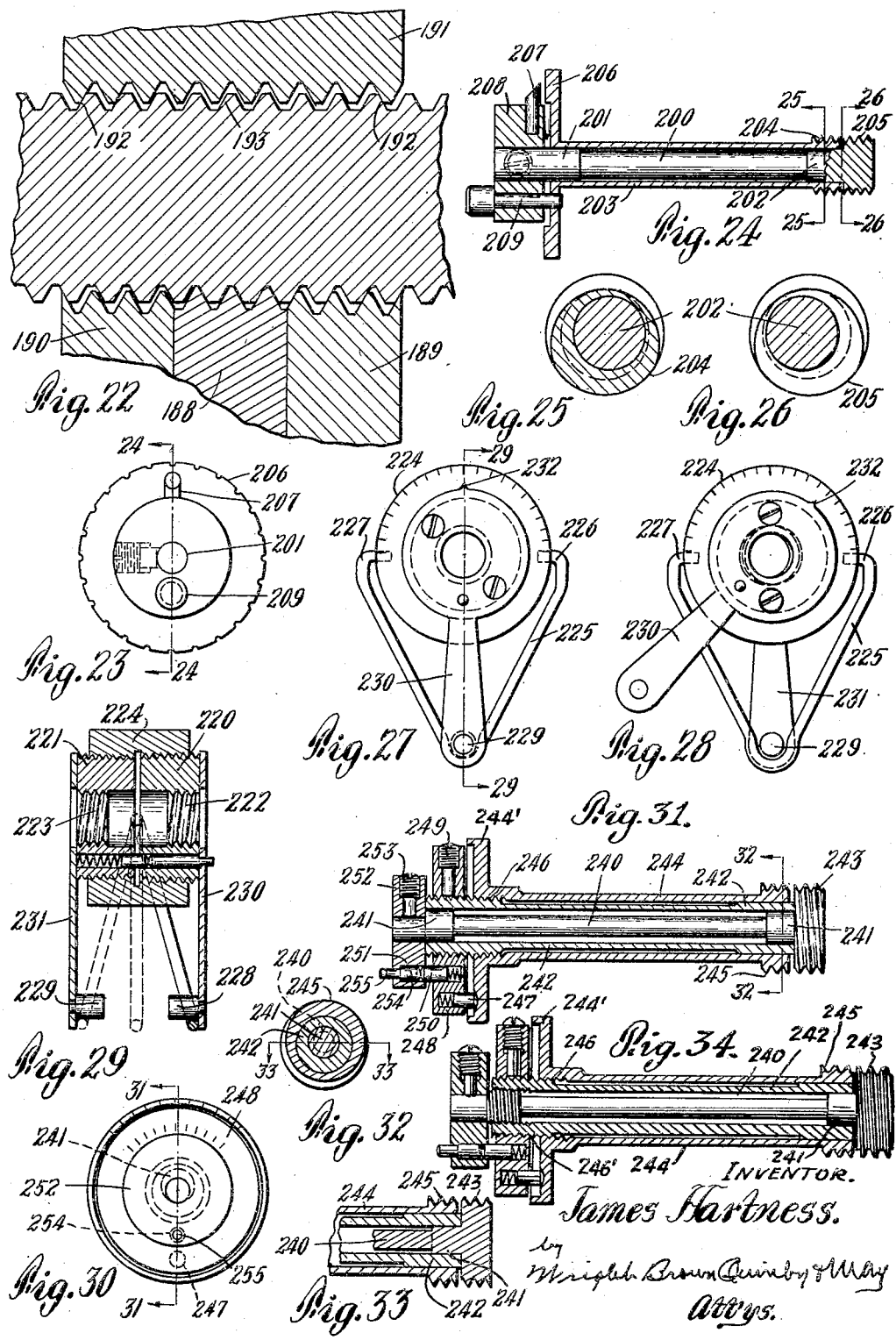

Patented Aug. 30, 1932

1,874,517

UNITED STATES PATENT OFFICE

JAMES HARTNESS, OF SPRINGFIELD, VERMONT

SCREW THREAD GAUGING

Application filed August 23, 1928. Serial No. 301,617.

This application is a continuation in part of my copending application Serial No. 192,236, filed May 18, 1927, for thread gauging. One of the most important phases of standardization of screw thread products is that of interchangeability, so that the products made in different parts of a manufacturing plant or in different manufacturing plants at a distance from each other may be assembled without difficulty and in a dependable manner.

In order that such interchangeability may be secured it is necessary that several elements be taken into account, none of which may be varied beyond predetermined limits for a certain class of fit. Important among these elements are major diameter, pitch diameter, minor diameter, angle of thread, and pitch or lead. A variation in any one of these elements of a screw thread from a fixed standard for any size will prevent a perfect fit.

Heretofore the suitability of threaded parts for interchangeability within a given class of fit has been tested by the use of various forms of gauges termed "go" and "not go." If the threaded member will be acceptable by the "go" gauge and unacceptable by the "not go" gauge it has been passed as sufficiently accurate.

A deficiency of the "go" and "not go" gauges is the fact that if the threaded work is accepted by the "go" gauge and refused by the "not go" gauge there is nothing to indicate how near the work is to being refused by the "go" gauge and accepted by the "not go" gauge; that is, how near its dimensions are to the standard. It is desirable, however, to determine a position between the upper and lower tolerance limits which permits the widest departures therefrom without causing rejection of the work and which, when the thread forming machine is once adjusted to it, will permit the machine to run longest without overrunning the boundaries of tolerance.

According to the present invention, therefore, gauging means are provided by which the nearness to this desirable position within the tolerance range of certain important elements or dimensions may be determined in an expeditious manner, and at the machine by which the threads are being formed, so that the machine operator may be guided as to proper adjustments of the machine to be made from time to time tending to correct the departures in either direction of such elements, or dimensions, from such mid-tolerance positions so that such departures may be maintained at all times within the tolerance limits. More specifically gauges by which departures from pitch diameters from those of standard threads may be indicated will be hereinafter disclosed and claimed.

Snap and ring gauges for outside work and plug gauges for inside work, as heretofore constructed, have been subject to abrasion and wear which makes it necessary to establish tolerance boundaries for such gauges. The gauges of the present invention are opening and closing gauges designed to compare taps, screws and other threaded parts directly with a standard plug gauge, eliminating the need of the usual intermediate gauges and loss of size of gauges having more or less fixed adjustments due to wear from use. The fact that these gauges are opening and closing gauges prevents wear thereon when the work is inserted or removed and they may be compared frequently with an inspector's gauge or even the standard gauge, if desired, without appreciable wear on those gauges. The plug gauge is the only member of the screw family which can be made with great accuracy and it alone is thus suitable for use as the foundation of all thread measurements including both external and internal threads. The gauges of the present invention, also, close with stress on the threads to be tested thus tending to even out surface inequalities and through out practically the entire thread circumference and they equalize inequalities in substantially the same manner as when the thread is in service.

In general each of these gauges comprises a plurality of threaded members engageable with standard threads with a relatively loose fit, and so carried or mounted that their threads are capable of measured relative motions into pressing engagement with the threads of the standard threaded member and of those members to be tested, variations in the extent of such motions, when applied to standard threads and to those to be tested, indicating in amount and direction variations of the threads to be tested from the standard threads.

The threaded members of my gauge may be permitted a relative movement transverse to the thread axis, the extent of such movement permitted by the specimen tested giving a direct indication of the pitch diameter. Where the pitch diameters of the threaded gauge elements do not differ too widely from that of the specimen so that the helix angles are not greatly different, a more extensive area of engagement is produced and on those portions of the thread surface most effective in taking stress, than in the case of measuring devices for the same purpose heretofore used in so far as I am aware. As will more fully appear also, the same members may be mounted to permit relative movements both axially and transversely.

For a more complete understanding of this invention, reference may be had to the accompanying drawings illustrating various embodiments of my invention and in which, Figure 1 is an elevation of a gauge embodying the present invention.

Figure 2 is a section on the line 2—2 of Figure 1.

Figure 3 is an elevation of one of the members shown in Figure 1.

Figure 4 is an elevation of a similar member having a different contour.

Figure 5 is an elevation of a modified construction.

Figure 6 is a section on the line 6—6 of Figure 5.

Figure 7 is an elevation of another modification.

Figure 8 is a section on the line 8—8 of Figure 7.

Figure 9 is an elevation of a further modified form.

Figure 10 is a section on the line 10—10 of Figure 9.

Figure 11 is a bottom plan view of the gauge shown in Figure 9.

Figure 12 is a section on the line 12—12 of Figure 10.

Figure 13 is an elevation of a somewhat different construction.

Figure 14 is a plan view of the gauge shown in Figure 13.

Figure 15 is a section on the line 15—15 of Figure 13.

Figures 16 and 17 show in elevation one of the parts of the gauge illustrated in Figure 13.

Figure 18 is an elevation of another modification.

Figure 19 is a plan view of the gauge shown in Figure 18.

Figure 20 is a section on the line 20—20 of Figure 18.

Figure 21 is an elevation of one of the parts of the gauge shown in Figure 18.

Figure 22 shows by a large scale section the effect of lead error on action of a gauge of the type shown in Figures 13 and 18 on a screw.

Figure 23 is an end elevation of a gauge for testing internal threads.

Figure 24 is a section on the line 24—24 of Figure 23.

Figure 25 is a section on the line 25—25 of Figure 24.

Figure 26 is a section on the line 26—26 of Figure 24.

Figures 27 and 28 show in elevation another form of gauge in two different positions of operation.

Figure 29 is a section on the line 29—29 of Figure 27.

Figure 30 is an end elevation of a modified form of gauge for internal threads.

Figure 31 is a section on the line 31—31 of Figure 30.

Figure 32 is a section on the line 32—32 of Figure 31.

Figure 33 is a section on the line 33—33 of Figure 32.

Figure 34 is a sectional view similar to Figure 31 showing a slightly different structure.

Referring to the drawings in detail, it will be seen that in each of the various forms of gauge illustrated there are two relatively movable gauging members arranged for engagement with a thread to be tested. In each case also there is relative motion transverse with respect to the axis of the thread under test. This transverse relative motion is accompanied by relative rotation of the members in the forms illustrated in Figures 1, 5, 9, 23, 27, 30 and 34, but not in the other forms illustrated. In the former case the transverse motion may be effected by the camming action of a surface which is eccentric to the axis of the thread under test. An example of this type is found in Figure 1. A disc-like member 100 is positioned between spaced internally threaded portions 101 of a block 102. The disc is centrally perforated and internally threaded, the threads of the disc and the members 101 being capable of being arranged to lie in a common helix, as shown in Figure 2. When the threads are thus arranged, the gauge may be said to be "open", or the member 100 in its "open" position relative to the block 102. The threads of the members 100, 101 are preferably formed to receive loosely a screw having the largest tolerated pitch diameter when the gauge is open. When a screw is to be tested the gauge members are put in their open position, the screw to be tested is inserted, then the members 100, 102 are relatively moved until the slack or clearance between the threads of the gauge members and the thread of the screw is taken up. The amount of such relative motion is noted and the screw is accepted or rejected according as the limit of relative movement is or is not within a predetermined range or zone of tolerance. In order to hold the parts 100, 101 normally in their open position, I may provide a spring-pressed pin 103 carried by the disc 100 and adapted to project partly into a recess in one of the members 101. In order to release the disc 100, I may provide a plunger 104 opposing the pin 103 in the recess and having a finger piece 105 projecting outwardly from the outer wall of the member 101. When the pin 103 is pushed out of the recess, the disc is free to move relatively to the block 102.

As shown in Figure 3, the disc 100 may be provided with a cam edge 106 which is eccentric to the central perforation. The cam edge 106 is adapted to ride against the end 107 of a threaded plug 108 which is in threaded engagement with the block 102 and which may be fixed in adjusted position as by a suitable set screw 109. When a screw to be tested has been inserted in the threaded bore of the members 100, 101, there are two ways in which the gauge may be operated after releasing the locking pin 103. First, the threaded plug 108 may be moved axially by rotation to push against the disc 100. To facilitate such operation, a knurled head 112 may be formed or mounted on the plug, the head being preferably provided with marks 111 to cooperate with an index 110 mounted on the block 102 to indicate the rotation of the plug 108 required to move the disc 100 laterally with respect to the block 102 sufficiently to take up the slack or clearance between the internal threads of the members 100, 101 and the thread of the screw under test. The marks 111 may be arranged to indicate a scale in any desired units, or may indicate zones of tolerance to serve as a criterion of acceptability of the screws tested. According to the second mode of operation, the plug 108 when once adjusted to touch the low point of the cam surface 106 when the gauge is open, is fixed in its position by the set screw 109. When the screw to be tested is in place and the pin 103 is released, the disc 100 is manually rotated. The eccentric surface 106 bearing against the plug end 107 will cause lateral movement of the disc 100 relative to the block 102 until the slack between the screw under test and the gauge is taken up. Suitable scale or zone marks may be made along the periphery of the disc to cooperate with an index on a member 101, as shown in Figure 1, to indicate the extent of movement of the disc. Sufficient clearance (Figure 2) is provided between the opposed faces of the disc 100 and the members 101 to avoid engagement between any two of these faces by reason of the axial advance of the disc when rotated on the screw under test. If the contour of the cam edge 106 is symmetrical from its low point to its high points, it will make no difference which way the disc is rotated from its open position, since the gauging effect is obtained solely from the extent of the motion of the disc transverse to the axis of the screw under test. Various other forms of cam edge contours may be provided. For example, Figure 4 illustrates a disc with a cam edge having its lowest point at 80, the radius of the edge increasing toward the right to a point 81. Moving toward the left from the point 80, there is a sharp increase of radius to a point 82 where the radius is equal to that at 81. Moving further to the left from the point 82 the radius increases gradually to a maximum at a point 83. In using a disc of this description the point 80 is in contact with the plug end 107 when the gauge is open. The radius at the points 81 and 82 is such that when a screw of maximum tolerated pitch diameter is in the gauge, the disc may be turned to bring either point in contact with the plug end 107, but not beyond these points. The point of contact between the plug end 107 and the disc for screws having the minimum tolerated pitch diameter will be between the points 82 and 83, and may be denoted by a suitable mark on the rim of the disc (as in Figure 1).

In using a gauge with a disc of this kind, the screw to be tested is inserted in the gauge when the latter is open, that is, when the plug end 107 is at the point 80. The disc is then turned toward the right, if possible, causing the plug end to ride up on the disc edge to the point 82. If the disc cannot be turned thus, this means that the pitch diameter of the screw is too large and the screw should be rejected. By turning the disc to the left, an idea may be gained as to the amount by which the pitch diameter exceeds the tolerated maximum. This information is frequently of value as a guide to amount of adjustment necessary for a screw cutting machine which is turning out oversize screws. If the disc can be turned to the right, this means that the pitch diameter of the screw thread under test is within the tolerated maximum. The disc is turned as far as possible to the right. If the plug end does not pass the limit point for minimum tolerated pitch diameter, the screw is acceptable. If it passes beyond such point, the screw is to be rejected as having too small a pitch diameter.

In Figures 5 and 6 a somewhat different construction is shown in which the gauge member 120 has a cam face 121 which in use bears against the end of a plug 122 extending through a marginal wall member 123 of the other threaded gauge member 124. This marginal wall member 123, as shown in Figure 5, extends somewhat more than one half the circumference about the member 120 which may be cut off at one or more points sufficiently to permit it to be placed in position within the marginal flange 123. This flange is provided with a lip portion 125 extending over the outer face of the gauge member 120 and normally retains the member 120 in position. At the flat face portion of the member 120 may be fixed the pointer 126 which acts to prevent the member 120 being turned to such an angular position that it may be removed from the member 124, and which also acts in cooperation with graduations on a flange portion 128 of the member 124 to indicate the extent of motion permitted the gauge member 120 when a standard screw or a screw to be tested is engaged by the gauging threads of the members 120 and 124.

In Figures 7 and 8 another embodiment of the invention is illustrated in which the movable gauge member 130 is positioned between the stationary gauge members 131 and 132, the member 131 being provided with a peripheral flange 133 within which the member 132 is engaged and there fixed by means such as the set screw 134. The movable member 130 is provided with an edge cam portion as 135 which engages an abutment screw 136 threaded through the flange member 133. Opposite to the screw 136 the flange member may be provided with a slot 137 in which rides a pin 138, the inner end of which engages in an opening in the member 130. This pin 138 serves as a handle by which the member 130 may be rotated, its engagement with the screw 136 causing it to be given a motion transverse to the axis of the gauge thread openings of the members 131 and 132. This pin 138 may be provided with an index pointer 139 cooperating with a scale or tolerance zones marked on the outer face of the flange member 133 adjacent thereto. The space within which the member 130 rotates may be made somewhat wider than the thickness of the member 130 in order to permit a free axial play to follow the lead of the screw as the member 130 is rotated, thus to prevent any motion except the transverse motion from being effective as a gauging motion.

In Figures 9 to 12 a somewhat similar construction has been shown except that the movable gauge member 140 is normally held in its open position with its gauging opening axially alined with the gauging openings of the outer gauge members 141 and 142. As shown this is accomplished by means of a spring pressed pin 143 having a rounded inner end as 144 bearing in a depression 145 in the face of the movable gauge member 140 when this member is in its gauge open position. In this construction also the gauge member 142 is seated in a portion 146 of an enlarged diameter in a marginal flange 147. Tolerance zones may be marked on the periphery of the member 140, as shown at 148 in Figure 11, and its cooperating fixed mark may be on one or both sides of the flaring slot 149 through which the handle pin 150 projects.

In Figures 13 to 17 is shown a different construction in which the movable gauge member comprises a cylindrical block 160 having its inner face curved and threaded, the threads being a portion only of a complete circumference. This block is mounted in a member 161 internally threaded as at 162 to form the gauging threads with which the gauging thread portions on the block 160 cooperate as will now be described. The block 160 is provided with a cylindrical shank 163 having an annular groove 164 adjacent to its upper end. This shank 163 is journaled in an externally threaded plug 165 and is retained in position therein by means such as the snap ring 166 engaging in the groove 164. This plug 165 is threaded in an opening 167 extending through the member 161 transversely to the axis of the threads 162. By rotation of this plug 165, therefore, it is evident that the block 160 is given a motion transverse to the axis of the gauging threads 162, the member 160 being keyed against rotation relative to the member 161 as by a screw 151 in the member 161 having a reduced end entering a longitudinal slot 152 in the member 160. The member 161 may be provided with a threaded extension 169 through which the plug 165 is threaded and on the external threads of this projection may be fixed a clamping ring 170 carrying an index finger 171 projecting across the head 172 of the plug 165. A stop pin 173 on this head may contact with opposite sides of the finger 171 as the plug is turned, thereby to limit its rotation to slightly less than a single turn. The upper face of the head 172 may be provided with suitable graduations, as shown in Figure 14, cooperating with the finger 171 to indicate the position of the gauging threads on the block 160 when the gauge is in use, thus to indicate the pitch diameter of the threads being gauged, or, if preferred, zones of tolerance may be indicated thereon.

In Figures 18 to 21 is shown a slight modification of this construction involving the use of differential threads by which a magnification of the indication may be provided. Referring to these figures, 180 indicates the movable block rectangular in cross section and having a recess 181 provided with gauging thread portions, this block having a threaded shank 182 which engages the internal threads of the plug 183. This plug 183 is externally threaded with threads of a different lead from its internal threads as at 184 and these threads engage mating threads in the gauge member 185. By turning the plug 183 it will be seen that it not only causes axial movements of the block 180, but the plug itself also moves axially. This axial movement of the plug is in the opposite direction to that of the block 180 relative thereto, so that the total movement of the block 180 is correspondingly lessened for a given angular rotation of the plug 183. With this construction it may be necessary to permit more than a single rotation of the plug 183 to produce the desired extent of movement of the gauging member 180, but as in the construction shown in Figures 13 to 17, a clamping collar 186 may be applied to the gauging member 185, this clamping collar carrying an index finger 187 for cooperation with a scale on the upper face of the plug 183.

One of the limitations of a gauge in which the two gauging members are given a relative transverse movement and where one of these gauge members engages the work between gauging threads of the other is illustrated diagrammatically in Figure 22. Referring to this figure, the movable gauging element is shown at 188 positioned between fixed gauging elements 189 and 190 on one side of the work, these members being continuous on the other side of the thread as shown at 191. Supposing now a screw having too long a lead is placed in the gauge and the gauge member 188 is brought down by its transverse motion against the threads of the member being tested, tending to force this member bodily against the threads of the member 191 opposite thereto, the lead being too long, the outer thread faces of the screw adjacent to opposite ends of the gauge, as shown at 192, bear against the inner faces of the gauging threads and prevent the screw being tested from taking a position where the central threads 193 are in engagement with the corresponding threads of the gauge. If the lead were correct the specimen being tested would be moved bodily nearer to the member 191, under pressure of the member 188 thereon, but the excess lead bringing the teeth faces at 192 into contact prevents this motion. It will thus be seen that the member 188 can not be moved as far as it would be moved had the lead been correct and consequently an erroneous indication of the pitch diameter of the specimen is given by the transverse position of the member 188, this pitch diameter appearing to be larger than it actually is. Should the lead error of the specimen be in the opposite direction, that is, the lead be too short, the opposite faces of the teeth near the ends of the gauging opening would bear against the corresponding thread faces of the member 191 which would likewise prevent the specimen from lateral movement to bring its central threads into contact with the corresponding threads of the gauge. This error would likewise thus give rise to an indication of a larger pitch diameter than actually exists.

In Figures 23 to 26 is shown a gauge construction making use of gauging members movable relative to each other by an eccentric pivotal motion and as applied to the testing of internal threads. Referring to these figures, at 200 is shown a spindle eccentrically journaled at the eccentric hubs 201 and 202 within a sleeve 203. At one end of the sleeve 203 are the external gauging threads 204 and cooperating with these threads are external gauging threads 205 on an enlarged end portion of the spindle 200. In one angular position of the spindle within the sleeve 203 the gauging threads 205 are coaxially arranged relative to the gauging threads 204 and lie in the same helical path. On rotation of the spindle 200 away from this position in either direction the gauging threads 205 are moved out of coaxial alinement with the threads 204, that is, transversely of the axis of the threads 204. The sleeve 203 is shown as provided with an outwardly extending flange portion 206 having on its outer face a scale over which rides an indicator point 207 carried by a head 208 fixed to the adjacent end of the spindle 200. The spindle and sleeve may be locked in gauge-open position,—that is, with the threads 205 coaxially arranged with the threads 204 and lying in the same helical path,—by means such as the removable pin 209. In order that the rotation of the threads 205 relatively to the threads 204 may not be effective to influence the gauge reading by reason of apparent axial advance of the threads due to such rotation, a sufficient amount of axial play must be permitted between the spindle 200 and the sleeve 203 to permit the threaded portion 205 to move axially as it rotates in order to seat itself between the threads of the specimen being tested. However, both the turning and transverse actions may be used simultaneously, if desired, in which case no axial movement of the spindle 200 in the sleeve 203 would be permitted.

Advantage may be taken in a single gauge of both axial and transverse movements of the gauge members relatively to each other, either of these actions being made use of independently of the other. Such a construction as designed for external threads is shown in Figures 27 to 29. Referring to these figures, more particularly to Figure 29, the internally threaded gauge members 220 and 221 are provided with gauging thread portions 222 and 223. As shown in this figure, these threaded portions are arranged spaced from each other by unthreaded portions, so that they bear considerably spaced apart on the work. Such substantial spacing of the gauging threads may be utilized where a magnification of lead error is desired, the lead error over a more extended length of screw being shown. One of these gauge members, as 221, is shown as having threaded engagement with internal threads of a collar 224, these threads being shown as of shorter lead than the gauging threads, so that when the member 221 is turned its gauging threads move out of the helical path in which they were positioned. The member 221, however, is externally threaded in concentric relation to the gauging threads so that this member maintains a coaxial position throughout its turning range. The gauging member 220 is threaded into the collar 224 by threads having the same lead as the gauging threads 222, but eccentrically disposed relative thereto. Thus as the member 220 is turned within the collar 224 the threads 222 would be maintained in the same helical path except that they are moved bodily laterally of the axis. Either of these members 220 and 221 may be held against rotation relative to the collar 224 while the other gauge member is permitted to have such rotation. This may be effected by means of the stirrup 225 having its inturned ends 226 and 227 journaled in diametrically opposed openings in the collar 224 so that the stirrup may be swung laterally into engagement with either one or the other of the lugs 228 and 229 carried by the handle members 230 and 231 fixed to the outer faces of the gauge members 220 and 221, respectively. Each of these handle members 230 and 231 may be provided with a scale pointer as at 232 (see Figures 27 and 28) cooperating with a scale marked on the adjacent end of the collar 224. As in constructions hereinbefore described, the zero mark on each scale is in the gauge open position where the gauging threads of both members lie in the same helical path and are coaxial.

In Figures 30 to 33 a gauge having the same capabilities of both relative axial and transverse movements of the gauging threads is shown, this construction being designed for gauging internal threads. These figures illustrate a gauge comprising a tubular sleeve 244 having an enlarged threaded portion 245 at one end to serve as a gauging member, and a disk-like enlargement 244' at its other end. Rotatable within the sleeve 244 is a quill 242, which is eccentrically bored to receive a pair of hub-members 241 which are connected by a spindle 240. Supported on the outer end of one of said hub-members 241 is a threaded gauging member 243. The latter is sufficiently eccentric to its hub-member 241 to offset the eccentricity of the bore of the quill 242 in which the hub-members 241 rotate, hence when the parts are in their normal positions, as illustrated in Figure 31, the gauging members 245, 243 are coaxial and their threads lie in a common helix. To facilitate manipulation of the gauge parts, a finger-piece 248 may be secured to the quill 242 as by a suitable set-screw 249, and a finger-piece 252 may be secured to the hub and cylinder member as by a set screw 253. In order to regulate the relative axial movement of the sleeve 244 and the quill 242, these members may have a threaded connection as at 246, this thread being of different and preferably smaller lead than the gauging threads of the members 243, 245. For one mode of operation of the gauge, the gauging member 243 may be locked to the quill 242 to rotate therewith, the locking means comprising some such device as a pin 250 slidable in a bore in the outer face of the finger-piece 248, the pin 250 being pressed for part of its length into an opposing bore in the finger-piece 252. In order to release the lock, a plunger 254 may be mounted in the bore in the finger-piece 252, abutting the pin 250 end to end, the plunger being provided with a reduced portion 255 which projects out from the outer face of the finger-piece 252 and may be pressed to move the pin 250 inward to release the lock. With the locking pin 250 in position, the finger-pieces 248 and 252, the quill 242, the hubs 241 and the gauging member 243 all rotate as a unit relatively to the sleeve 244 and disk 244'. The gauge may be yieldingly maintained in its normal or open condition as by a spring-pressed pin 247 slidable in a bore in the inner face of the finger-piece 248, a rounded end of the pin being resiliently pressed into a shallow recess in the opposed face of the disk 244'. Suitable marks to indicate angles of rotation or zones of tolerance may be made on the rim of the disk 244' as indicated in Figure 30.

If the locking pin 250 is pushed inwardly to permit relative rotation between the finger-piece 252 and the finger-piece 248, the latter may be held with the disk 244' so that the sleeve 244 and quill 242 rotate as a unit with reference to the hub members 241. Since the gauging member 243 is eccentrically mounted on its hub member 241, and the latter is offset from the axis of the gauging member 245, rotation of the hub members will cause a transverse displacement of the member 243 relative to the member 245, this transverse effect being combined with the apparent advance of the thread of the member 243. This second mode of using the gauge is hence considerably less sensitive than the first mode described.

The transverse gauging effect may be obtained, unaugmented by an axial effect, by providing a threaded connection, as shown at 246' in Figure 34, between the spindle 240 and the quill 242. The thread 246' is made with a lead equal to that of the thread of the member 243 so that when the latter is rotated relatively to the quill 242, the apparent advance of its thread is eliminated, and the gauging action is entirely due to transverse motion of the member 243.

Each of the embodiments which have heretofore been described utilize the action of a pair of threaded gauge members having the pitch diameters of their gauging threads different from the standard or basic pitch diameters in their particular sizes by an amount at least as great as the tolerance limits, in the case of the external thread gauge the pitch diameter being large and in the case of internal thread gauges the pitch diameter being small. Where taps which must exceed the standard pitch diameter are to be gauged, the pitch diameter of the gauge must be correspondingly greater so that any tap which comes within the tolerance limits for that particular size may be readily placed in the gauge when the gauge members are in open position. The term "maximum tolerable screw to be tested" as used in certain of the claims, therefore, is intended to mean in the case of the testing of external threads, a screw of the largest tolerable pitch diameter, while in the case of the testing of internal threads, a nut of the smallest tolerable pitch diameter. It will also be seen that the gauge members are given a controlled relative transverse movement, the possible extent of such movement when applied to a test piece as indicated by the gauge markings when compared with the corresponding indications of extent of motion permitted when a standard threaded member is in the gauge being a measure of the fit of the piece tested.

Having thus described these several embodiments of the invention, it should be evident to those skilled in the art that various other changes and modifications might be made therein without departing from the spirit or scope of the invention.

I claim:

1. A gauge comprising a pair of threaded members each of a pitch diameter sufficiently different from basic and in the proper direction to cause said members to loosely fit the maximum tolerable screw to be tested, means for supporting said members for relative rotation combined with movement transversely of their thread axes and with the threads of said members lying in a common helical path in one relative position only, and means for facilitating the comparison of the extents of permissible relative motion when said members are in engagement with said standard threaded member and when in engagement with a threaded member to be tested.

2. A gauge comprising a pair of threaded members each of a pitch diameter sufficiently different from basic and in the proper direction to cause said members to make a loose fit with the maximum tolerable screw to be tested, means for supporting one of said members for rotation and motion laterally of its axis relative to the other of said members, from a relative position in which the threads of said members lie in a common helix, and means for facilitating the comparison of the extents of motion permissible when said gauge is in engagement with a standard threaded member and when in engagement with a threaded member to be tested.

3. A gauge comprising a pair of threaded members each of a pitch diameter sufficiently different from basic and in the proper direction to cause said members to make a loose fit with the maximum tolerable screw to be tested, means for supporting one of said members for rotation about an axis eccentric to the axis of the threaded portion of the other of said members from a relative position in which the threads of said members lie in a common helix, and means for facilitating the comparison of the extents of motion permissible when said gauge is in engagement with a standard threaded member and when in engagement with a threaded member to be tested.

4. A gauge comprising a pair of relatively rotatable gauging members having threaded bores with threads capable of being arranged to lie in a common helix, one of said members having a periphery with an arcuate portion eccentric to the axis of its bore, the other said member having a portion adapted to engage said peripheral portion.

5. A gauge comprising a pair of relatively rotatable gauging members having threaded bores with threads capable of being arranged to lie in a common helix, one of said members having a periphery with an arcuate portion eccentric to the bore of its member, the other said member having an element supported thereby to engage said peripheral portion, said element being adjustable to or from the bore of said other member.

6. A gauge comprising a pair of relatively rotatable gauging members having threaded bores with threads capable of being arranged in a common helix, one of said members having a disk-like shape with a portion of its periphery gradually varying in radial distance from the bore of said one member, the other said member having an element screw-threaded therein, said element having an end adapted to bear against said periphery whereby rotation of said one member relative to the other said member causes relative motion of said members transverse to the axis of said bores.

7. A screw thread gauge comprising a pair of gauging members, one of said gauging members having a threaded bore therethrough to receive a screw to be tested, the other said member having thread elements capable of coinciding with the helix defined by the thread of the first said member, said members having interengaging means for effecting gauging movement of said second member transversely to the axis of said bore.

8. A screw thread gauge comprising a gauging member having a threaded bore to receive a screw to be tested, a second gauging member having thread elements capable of coinciding with the helix defined by the thread of the first said member, means normally holding said members with their thread elements in a common helix, said holding means being actuable to move the thread elements of the second said member transversely with respect to the axis of said bore, and means for indicating the extent of such motion.

In testimony whereof I have affixed my signature.

JAMES HARTNESS.